Nov. 5, 1963   J. G. M. J. DE WOUTERS D'OPLINTER   3,109,357
FOCAL-PLANE PHOTOGRAPHIC SHUTTER
Filed July 20, 1961   3 Sheets-Sheet 1

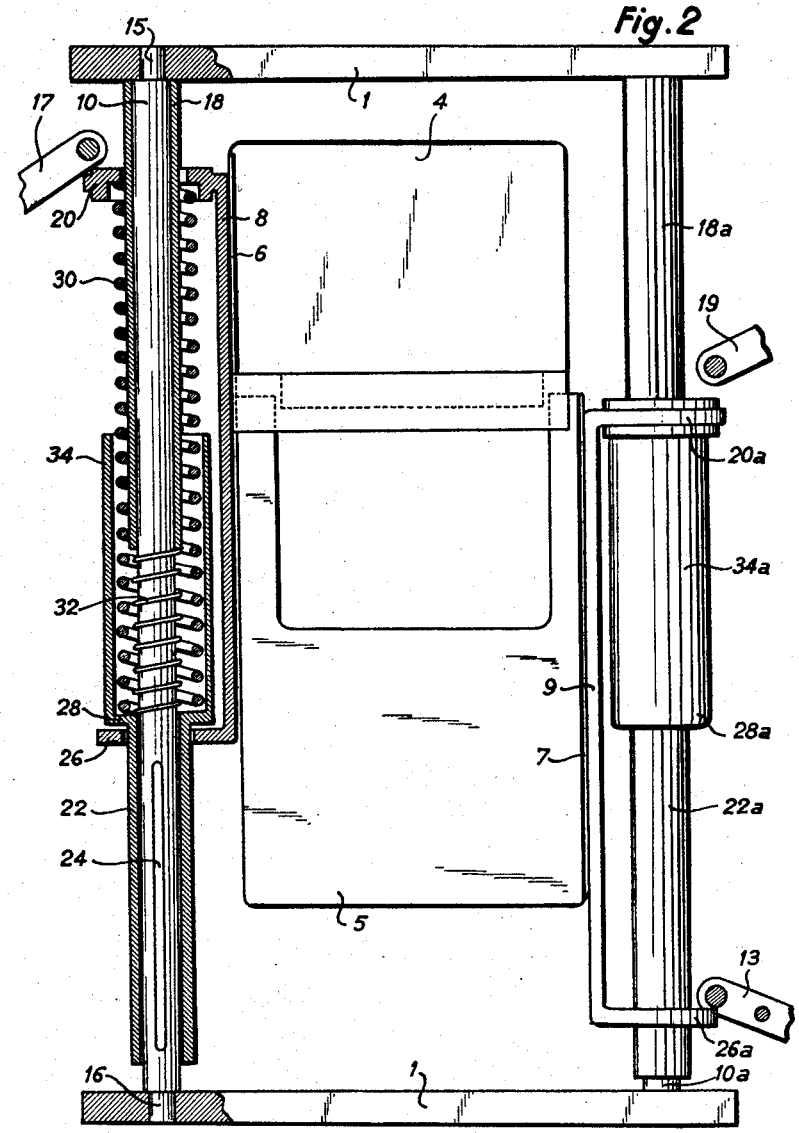

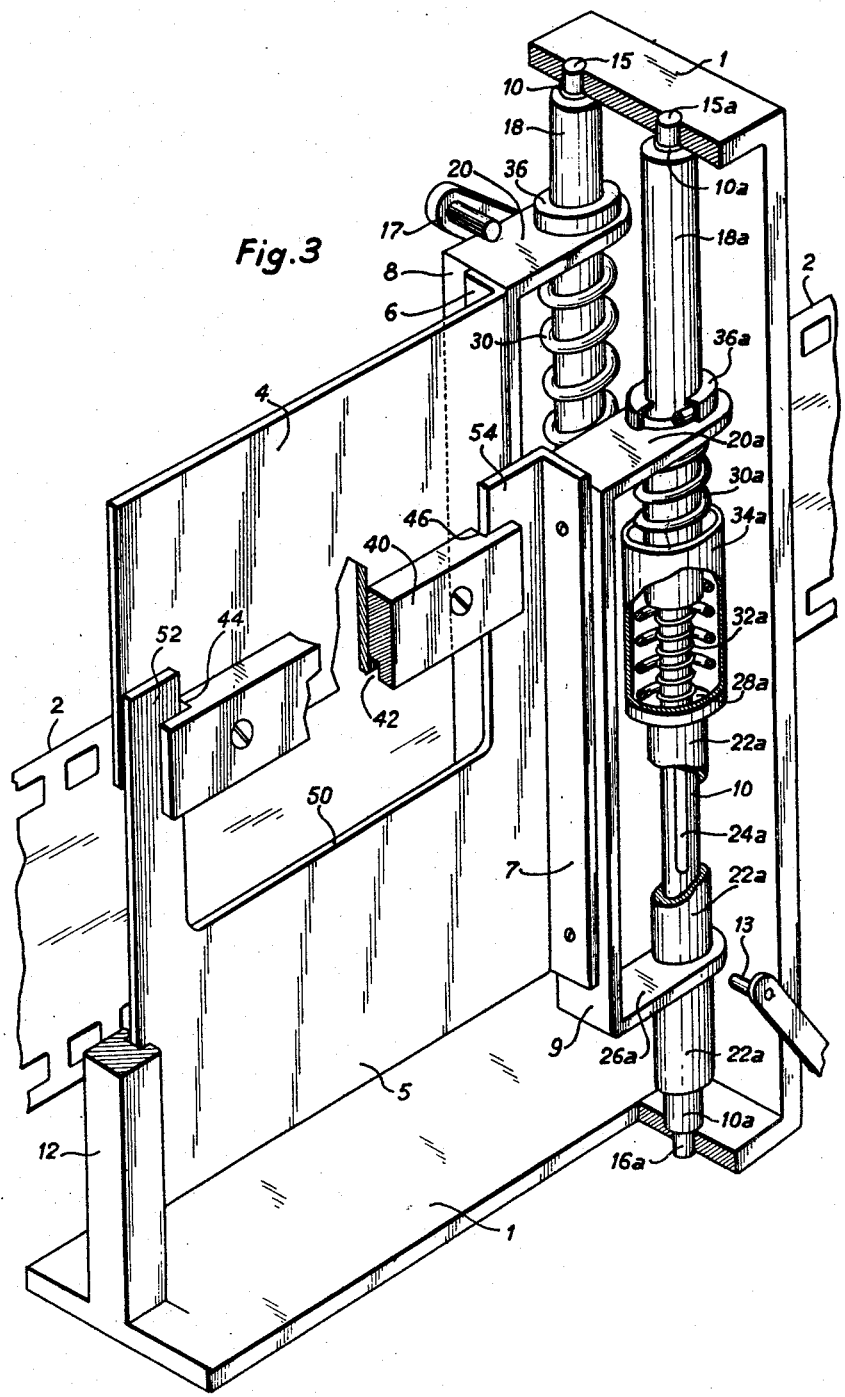

United States Patent Office 3,109,357
Patented Nov. 5, 1963

3,109,357
FOCAL-PLANE PHOTOGRAPHIC SHUTTER
Jean Guy Marie Joseph de Wouters d'Oplinter, Roquefort-les-Pins, France, assignor to La Spirotechnique, Paris, France
Filed July 20, 1961, Ser. No. 125,431
Claims priority, application France July 25, 1960
4 Claims. (Cl. 95—55)

This invention relates to a focal-plane photographic shutter of the kind provided with rigid blades which travel in the vicinity of the focal plane, in parallel relationship with said plane.

An object of the invention is to improve the operation of a shutter of the considered type, by preventing the shutter blades from bouncing back at the end of an exposure stroke.

According to the present invention, each rigid shutter blade is provided with frictional damping means which are associated with the shutter blade driving and guiding means.

In a preferred embodiment of the invention, each blade is guided by a stationary rod, and the damping means, as well as the shutter blade driving spring, are arranged coaxially to the said guide rode.

The damping means according to the present invention comprise a friction member frictionally slidable on the stationary guide rod of the shutter blade, and a small compensating spring, which is preferably a helical spring wound around the guide rod coaxially with the shutter blade driving spring, in such manner that this small compensating spring will be compressed by the motion of the shutter blade on completion of an exposure stroke, while the friction member will slide frictionally on the guide rod.

The shutter blade may be supported on the guide rod by two eyelets which are attached at the upper and lower corners of the blade and slide freely on the guide rod. The upper eyelet also forms a mobile thrust collar for the driving spring, and is an intermediary driving member between the driving spring and the shutter blade. The lower eyelet slides freely on the lower part of the guide rod.

According to a first embodiment of the invention, the frictional damping member is a metal tube sliding frictionally on the lower part of the guide rod, and the lower eyelet of the shutter blade slides freely on this friction tube. The friction tube carries, at its upper end, a washer which forms the lower thrust member for both the driving spring and the compensating spring. Preferably, this washer is made integral with the friction tube and also forms the bottom of a tubular casing encircling both helical springs. The length of this casing is approximately equal to the length of the stroke of one shutter blade, so that the upper eyelet of the shutter blade may abut against this casing and press it down together with the friction member when this eyelet is pressed down for cocking the shutter.

Preferably, the lower portion of the guide rod is split longitudinally, so that it may be easily expanded to the suitable thickness corresponding to the desired friction force with the friction tube.

According to a second embodiment of the invention, the frictional damping member is a resilient ring, preferably a simple toric ring made of natural or synthetic rubber, which slides frictionally on the guide rod, between the lower eyelet of the shutter blade and the bottom of the tubular casing of the springs. In this embodiment, the longitudinal slit of the guide rod is omitted, and a shoulder is provided on the guide rod, which coacts with an inner shoulder of the tubular casing for restricting the downward stroke of the tubular casing and therefore of the springs.

The invention will now be further described with reference to the appended drawing, in which:

FIG. 2 is a diagrammatic elevation of a first embodiment of a shutter according to the invention.

FIG. 3 is a perspective view of a slightly modified version of the device of FIG. 2.

Figure 1:
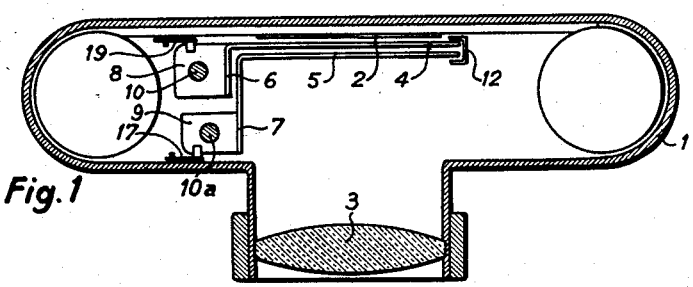
FIG. 1 is a diagrammatic view of a camera provided with a shutter according to the invention, shown in cross-section along the horizontal diametral plane of the objective.

Referring first to FIG. 1, the camera housing 1 contains a photosensitive surface 2, in the focal plane of an objective 3. In front of this surface run two rigid shutter blades 4 and 5, which are guided by vertical stationary rods 10 and 10a, in such manner that their exposure stroke may run upwards, preferably along the smaller side of the image. The side edge of each blade may for instance be folded at a right angle, as shown in 6 and 7, and the folded edge be attached to a guide strap 8, 9 the upper and lower ends of which 20 and 26, are again folded at right angles so as to form a yoke provided with two eyelets traversed by the guide rod 10.

The blades may further be guided by their other side edge in a vertical groove 12 of the camera casing. The shutter is provided with a cocking lever 17 coacting with the upper yoke bushing 20, and with two triggers 13 and 14 coacting respectively with the shutter blades.

The cocking lever and triggers are obviously connected to appropriate driving members, which are not shown here, since they do not form a part of the present invention.

Referring now to FIG. 2, the guide rods 10 and 10a are held at 15 and 15a inside the camera housing. The upper portion of each guide rod is surrounded by a stationary spacer tube 18 around which the upper bushing 20 of the blade strap 8 slides freely. In FIGS. 2 and 3, the members associated respectively with the lower and upper shutter blades are identical and carry the same reference numbers, those pertaining to the lower blade 5 being further identified by the letter "a" following their reference number. The lower portion of each guide rod is surrounded by a friction tube 22 which is frictionally slidable on said rod. For facilitating adjustment of the friction force, which may have an average value of approximately 200 grams in a 24 x 36 mm. camera, the guide rod is provided with a longitudinal slit 24, in which a tool may be inserted for adjusting the rod thickness.

The lower bushing 26 of the blade strap 8 slides freely on the lower part of the guide rod, around the friction tube 22.

The top of tube 22 carries a shoulder or washer 28, against which rest two helical springs, the stronger one 30 being the driving spring for impelling the shutter blade upwards by means of the upper bushing 20 of yoke 8, spring 30 being initially compressed between said bushing 20 and the shoulder 28 at the top of tube 22, when the cocking lever 17 urges the bushing 20 downward. The smaller spring 32 is inserted inside the main spring 30, and is normally compressed between the lower end of the spacer tube 18 and the washer 28.

Around both springs is shown a tubular casing 34, the lower end of which is preferably integral with the spring retaining washer 28 and also with the friction tube 22. The length of the casing 34 is such that the upper yoke bushing 20 will rest against the top of said casing when the main spring 30 is compressed for cocking the shutter.

The guide rod 10a shown at the right side of FIG. 2 carries exactly the same parts as rod 10, numbered 15a to 34a.

FIG. 3 shows a preferred embodiment of the invention, in which rods 10 and 10a are arranged side by side, as in FIG. 1, instead of being on either side of the shutter blades, as in FIG. 2. Both arrangements are convenient, but the side-by-side arrangement is perhaps of easier manufacture.

FIG. 3 shows exactly the same parts as FIG. 2, with a few additional features. The upper bushings 20 and 20a are respectively provided with a thimble 36—36a for retaining the driving spring 30. The lower edge of the upper shutter blade 4 is provided with a light-sealing strip 40 heaving a longitudinal groove 42 in which the upper edge 50 of the lower blade 5 becomes inserted when the shutter closes, so as to form a tight light seal. The sealing strip 40 is further provided with side grooves 44 and 46 in which two lateral extensions 52 and 54 of the lower blade 5 are slidably guided, so that the shutter blades are thus mutually guided, and complete light-sealing of the closed shutter is achieved.

Figure 4:
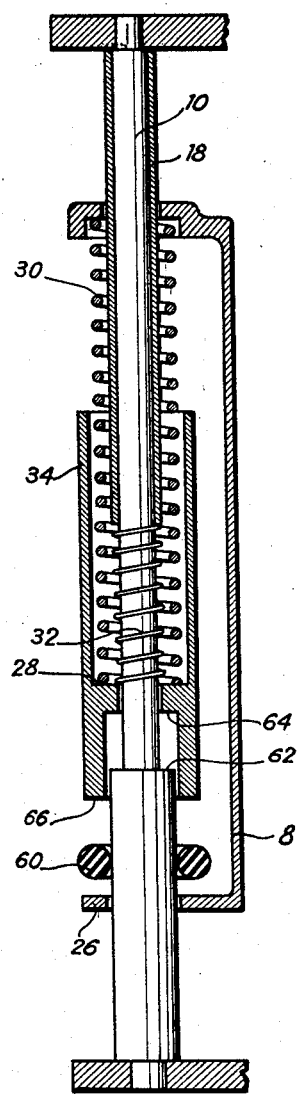
FIG. 4 is a diagrammatic elevation of a second embodiment of a shutter according to the invention, in which the frictional damping member is an O-ring.

FIG. 4 shows a modified embodiment of the invention, in which the frictional damping member is a toric ring 60 made of an elastomer, such as natural or synthetic rubber, which is frictionally slidable on the guide rod 10, between the lower spring-retaining member 28 and the lower bushing 26 of the yoke 8. In this embodiment, the slit 24 of the guide rod is omitted, as well as the lower extension 22 of the tubular member 34. A shoulder 62 is provided on the guide rod 10, which coacts with an internal shoulder 64 of the tubular casing 34 for limiting its downward stroke, which, in the previously described embodiment, was limited by the lower tubular extension 22 or friction tube abutting against the lower wall of the camera housing.

The friction ring 60 is alternatively pushed downward by the lower end 66 of the tubular casing 34, and upward by the strap eyelet 26, according to the different phases of operation of the shutter.

At the end of an upward exposure stroke of either shutter blade, the friction ring 60 which has previously been pushed down by the spring bushing 34 is pushed up by the strap 26 and thus exerts the desired damping effect at the end of an exposure stroke.

The operation is quite similar in both embodiments of the invention. Referring for instance again to FIGS. 2 and 3, the shutter is cocked by lever 17 urging downward the upper yoke strap 20 of the upper blade 4. This blade in turn urges down the lower blade 5 by its grooved strip 40. Both blades are subsequently held down by their respective triggers 13 and 13a, coacting respectively, for instance, with the lower yoke straps 26 and 26a connected with the first and second blades. When a trigger 13 is released, the blade first slides upward, being driven by main spring 30, until strap 26 abuts against the frictional damping member, that is, either the O-ring 60 in the last-described embodiment (FIG. 4), or the shoulder 28 of the friction tube 22 in the first embodiment (FIGS. 2 and 3). Simultaneously, the compensating spring 32 becomes compressed between the shoulder 28 and the spacing tube 18. Preferably, the frictional force is chosen so as to be slightly stronger than spring 32, so that the shutter blade stops at the end of its exposure stroke without bouncing back. When the shutter is cocked again for the next exposure, spring 32 expands and supplies a useful fraction of the force necessary for pushing back down the friction member, that is either O-ring 60 or tube 22, into its initial position for another exposure stroke.

While the invention provides a simple and effective damping of the shutter operation, which becomes particularly smooth and regular, it also offers the advantage of placing the main fraction of the weight of the mobile assembly very close to the guide rod, and also lends itself conveniently to the design of a structure in which the shutter blades are guided over a relatively extensive length.

The specific embodiments disclosed hereinabove are merely illustrative of the principles of the invention, and not limitative, while various modifications may be made within the scope of the invention.

What I claim is:

1. A focal-plane shutter of the type comprising two laterally guided rigid blades, said shutter comprising, in association with each blade, respectively, a lateral guide yoke having an upper and a lower eyelet both engaged slidably on a stationary guide rod, a blade-driving coil spring wound about said guide rod and compressible between said upper eyelet and a bushing slidable on said guide rod, cocking and triggering means coacting with said yoke for respectively compressing and releasing said blade-driving spring, and a damping member frictionally slidable on said guide rod between said bushing and said lower eyelet.

2. A focal-plane shutter according to claim 1, in which the damping member is a tube made of rigid material and the guide rod is provided with a longitudinal slit for facilitating expansion of said rod into frictional contact with said tube.

3. A focal-plane shutter according to claim 1, in which the damping member is a toric ring of elastomer material frictionally engaged on the guide rod.

4. A focal-plane shutter of the type comprising two rigid blades, in which each blade is respectively connected to a guide yoke having an upper and a lower eyelet both engaged slidably on a stationary guide rod, said shutter comprising a main coil spring wound about said guide rod between said upper eyelet and a bushing slidable on said guide rod between said upper eyelet and a first stationary retaining member located below said upper eyelet, a smaller coil spring wound about said rod inside said main spring between said slidable bushing and a second stationary retaining member, a tubular extension integral with said bushing and surrounding said springs, and a damping member frictionally slidable on said guide rod between said bushing and said lower eyelet.

References Cited in the file of this patent

UNITED STATES PATENTS

| | | |
|---|---|---|
| 670,844 | Cobb | Mar. 26, 1901 |
| 2,198,729 | Junghans | Apr. 30, 1940 |
| 2,267,794 | Kosken | Dec. 30, 1941 |
| 2,953,076 | Leuschke | Sept. 20, 1960 |